United States Patent
Ishida et al.

(10) Patent No.: US 8,645,041 B2
(45) Date of Patent: Feb. 4, 2014

(54) SLIP CONTROL APPARATUS AND SLIP CONTROL METHOD

(75) Inventors: Yasuhito Ishida, Toyokawa (JP); Gen Inoue, Susono (JP)

(73) Assignees: Advics Co., Ltd., Kariya, Aichi-Pref. (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 1190 days.

(21) Appl. No.: 12/174,316

(22) Filed: Jul. 16, 2008

(65) Prior Publication Data

US 2009/0024294 A1    Jan. 22, 2009

(30) Foreign Application Priority Data

Jul. 18, 2007    (JP) .................................. 2007-187168

(51) Int. Cl.
*B60T 7/12*    (2006.01)
*B60K 28/16*    (2006.01)

(52) U.S. Cl.
USPC ........................................... 701/87; 180/197

(58) Field of Classification Search
USPC ...................... 701/87, 71, 74, 82, 90; 180/197
See application file for complete search history.

(56) References Cited

U.S. PATENT DOCUMENTS

| | | | |
|---|---|---|---|
| 4,967,869 A | 11/1990 | Nagaoka et al. | |
| 5,041,978 A | 8/1991 | Nakayama et al. | |
| 2003/0014174 A1 | 1/2003 | Giers | |
| 2004/0215385 A1 | 10/2004 | Aizawa et al. | |
| 2006/0161328 A1* | 7/2006 | Hoshiba et al. | 701/84 |
| 2006/0219454 A1* | 10/2006 | Itoh et al. | 180/197 |
| 2008/0086248 A1* | 4/2008 | Lu et al. | 701/41 |

FOREIGN PATENT DOCUMENTS

| | | |
|---|---|---|
| DE | 199 61 720 A1 | 8/2001 |
| DE | 101 14 273 A1 | 10/2002 |
| EP | 1 257 432 B1 | 5/2005 |
| JP | 61-085248 A | 4/1986 |
| JP | 1-247221 A | 10/1989 |
| JP | 2-290732 A | 11/1990 |
| JP | 8-164834 A | 6/1996 |
| JP | 2004-090679 A | 3/2004 |

OTHER PUBLICATIONS

Official Action issued on Aug. 8, 2011 by the German Patent Office in corresponding German Patent Application No. 10 2008 033 648.3, and English language translation of the Official Action.

* cited by examiner

*Primary Examiner* — Muhammad Shafi
(74) *Attorney, Agent, or Firm* — Buchanan Ingersoll & Rooney PC

(57) ABSTRACT

A slip control apparatus includes a driving torque calculating means calculating driving torque, a driving torque applying means applying the calculated driving torque to driving wheels, and a slip restraining means restraining slippage at each driving wheel when the slippage occurs at each driving wheel, wherein when the slippage occurs at each driving wheel, the driving torque calculating means calculates demanded torque and adds consumed driving torque, which corresponds to the driving torque consumed for restraining the slippage at each driving wheel by the slip restraining means, to the calculated demanded torque to calculate the driving torque.

15 Claims, 6 Drawing Sheets

SLIP CONTROL APPARATUS AND SLIP CONTROL METHOD

CROSS REFERENCE TO RELATED APPLICATIONS

This application is based on and claims priority under 35 U.S.C §119 with respect to Japanese Patent Application 2007-187168, filed on Jul. 18, 2007, the entire content of which is incorporated herein by reference.

FIELD OF THE INVENTION

The invention relates to a slip control apparatus including a driving torque calculating means calculating driving torque, a driving torque applying means individually applying he calculated driving torque to driving wheels, and a slip restraining means restraining wheel slippage when slippage occurs at the individual driving wheels. Further, the invention relates to a slip control method calculating the driving torque, applying the calculated driving torque to the driving wheels individually and restraining the slippage when the slippage occurs at the individual driving wheels.

BACKGROUND

When a vehicle is driven with one of a pair of left and right driving wheels being on a low μ road surface, or when a vehicle is driven with one of a pair of left and right driving wheels not sticking to the road due to bumps on the road surface, the one of the pair of left and right driving wheels may slip. In such a case, the driving torque may not be applied to the non-slipping driving wheel because a differential device operates so as to apply a large driving torque to the slipping driving wheel and the wheel spins freely. Thus, when slippage occurs at one of a pair of left and right driving wheels, a slip restraining means restrains the slippage at the driving wheel.

A known slip control apparatus sets a target vehicle speed when a driver does not intend to accelerate, decelerate, or stop a vehicle. The known slip control apparatus adjusts the amount of the driving torque applied to driving wheels and the amount of the braking torque applied to individual wheels, thereby controlling the vehicle speed so as to correspond to the target vehicle speed. This control allows the vehicle to be driven at a constant speed when the driver does not intend to accelerate, decelerate, or stop the vehicle. Since the vehicle speed is calculated based on wheel speeds of the individual wheels, when slippage occurs at a driving wheel, the vehicle speed increases in conjunction with an increase in a rotation speed of the slipping driving wheel. Thus, when the slippage occurs at the driving wheel, the driving torque is controlled to be reduced so that the vehicle speed corresponds to the target vehicle speed. (For example, refer to JP 2004-90679A). Namely, in the slip control apparatus disclosed in JP 2004-90679A, the slip restraining means restrains the slippage by reducing the driving torque.

In another known slip control apparatus, when accelerating operation and braking operation are simultaneously conducted and slippage occurs at one of a pair of left and right wheels, braking torque is applied to a non-slipping driving wheel by operating the brake and also braking torque, which is larger than the braking torque generated by the braking operation, is applied to a slipping driving wheel (For example, JP H8-164834A). Thus, in the known slip control apparatus disclosed in JP H8-164834A, the slip restraining means restrains the wheel slippage by applying the braking torque to the slipping driving wheel.

Further, in another known slip control apparatus, when slippage occurs at a driving wheel, braking torque is applied to a slipping driving wheel and driving torque is reduced, (For example, refer to JP S61-85248A). Thus, in the known slip control apparatus disclosed in JP S61-85248A, the slip restraining means restrains the wheel slippage by applying the braking torque to the slipping driving wheel and reducing the driving torque.

In the slip control apparatus disclosed in JP 2004-90679A, the slip restraining means reduces the driving torque. Thus, when the slippage occurs at the one of the pair of left and right wheels, the driving torque of the non-slipping driving wheel is reduced due to the reduction of the driving torque to decrease the vehicle speed. Accordingly, the vehicle speed becomes lower than the target vehicle speed and hinders the vehicle from being driven at the demanded target vehicle speed.

In the slip control apparatus disclosed in JP H8-164834A, the slip restraining means applies the braking torque to the slipping driving wheel, and a state, in which the driving torque is hindered from being transmitted to the non-slipping driving wheel, is prevented by means of the differential device. However, the driving torque is consumed for applying the braking torque and hence the vehicle speed is lowered. Therefore, the driver is unable to drive the vehicle at a demanded vehicle speed by operating an accelerator.

In the slip control apparatus disclosed in JP S61-85248A, the slip restraining means reduces the driving torque and applies the braking torque to the slipping driving wheel. The reduction of the driving torque is conducted in the same mariner as that of the slip restraining means disclosed in JP 2004-90679A, and the braking torque is applied to the slipping driving wheel in the same manner as that of the slip restraining means disclosed in J-P H8-164834A. Thus, in the slip control apparatus disclosed in JP S61-85248A, as in TP 2004-90679A and JP H8-164834A, when the slippage occurs at the one of the pair of left and right wheels, the vehicle speed lowers and the driver is unable to drive the vehicle at the demanded vehicle speed by operating the accelerator.

The present invention has been made in view of the above circumstances, and provides a slip control apparatus and a slip control method, which enable a vehicle to be driven at a demanded vehicle speed by restraining vehicle speed reduction when slippage occurs at driving wheel(s).

SUMMARY OF THE INVENTION

According to an aspect of the present invention, a slip control apparatus includes a driving torque calculating means calculating driving torque, a driving torque applying means applying the calculated driving torque to driving wheels, and a slip restraining means restraining slippage at each driving wheel when the slippage occurs at each driving wheel, wherein when the slippage occurs at each driving wheel, the driving torque calculating means calculates demanded torque and adds consumed driving torque, which corresponds to the driving torque consumed for restraining the slippage at each driving wheel by the slip restraining means, to the calculated demanded torque to calculate the driving torque.

According to another aspect of the present invention, a slip control method includes the steps of calculating driving torque, applying the calculated driving torque to driving wheels, and restraining slippage at each driving wheel when the slippage occurs at each driving wheel, wherein when the slippage occurs at each driving wheel, the driving torque is calculated by adding consumed driving torque, which corresponds to the driving torque consumed for restraining the slippage at each driving wheel, to demanded driving torque.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A slip control apparatus according to a first embodiment will be described with reference to drawings.

[First Embodiment]

Figure 1:
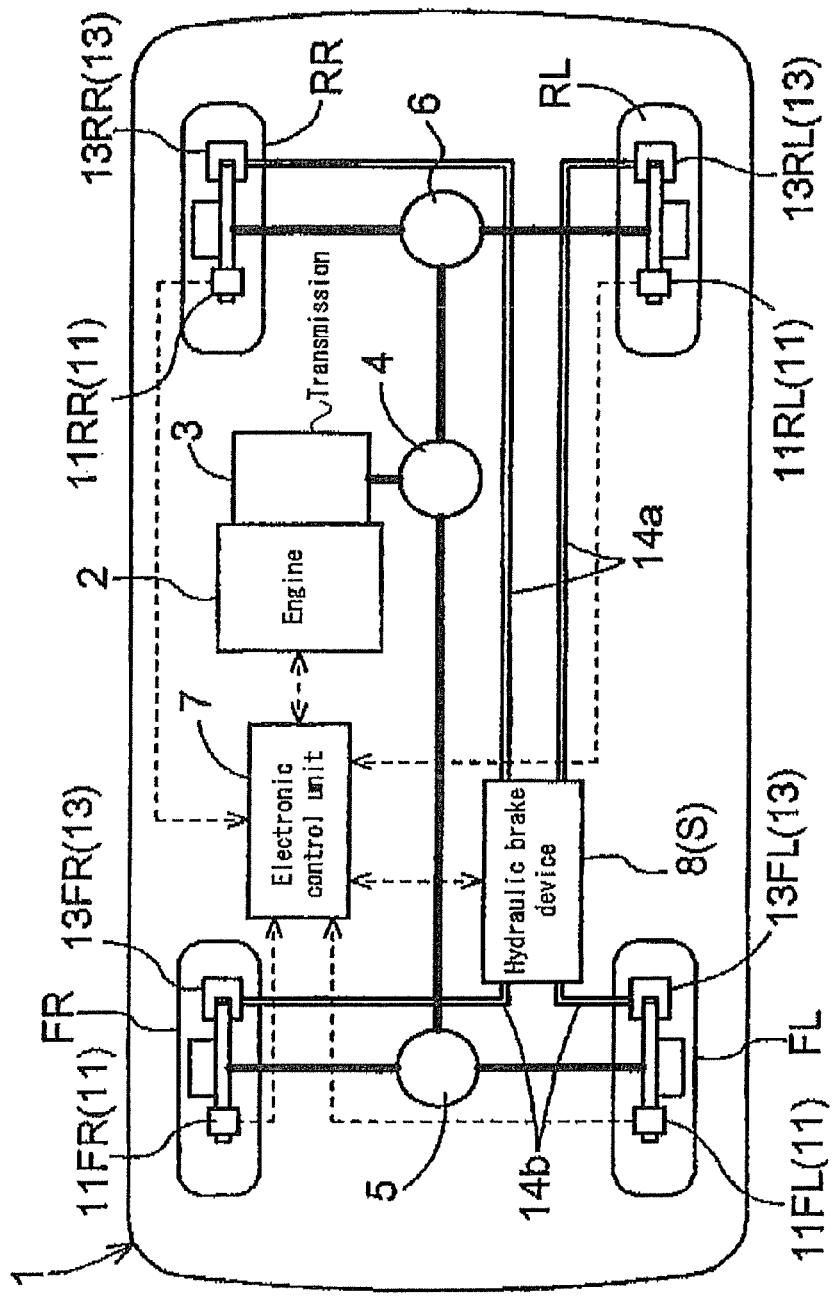
FIG. 1 is a general system overview of a vehicle.

As shown in FIG. 1, a vehicle 1 transmits output of an engine 2 to each of a front right wheel FR, a front left wheel FL, a rear right wheel RR and a rear left wheel RL, and these four wheels serve as driving wheels. Specifically, the output of the engine 2 is transmitted to the front right wheel FR and the front left wheel FL through a transmission 3, a center differential device 4 and a front differential device 5. Further, the output of the engine 2 is transmitted to the rear right wheel RR and the rear left wheel RL through the transmission 3, the center differential device 4 and a rear differential device 6. As just described, a driving torque applying means is comprised of the engine 2 and a driving force transmitting mechanism transmitting the output of the engine 2 to the individual wheels.

An electronic control unit 7 and a hydraulic brake device 8 axe provided at the vehicle 1. The electronic control unit 7 is comprised of a CPU, a ROM, a RAM, and a microcomputer having input and output portions. Wheel speed sensors 11 are provided for detecting each wheel speed, and the wheel speed sensors 11 are comprised of wheel speed sensors 11FR, 11FL, 11R, and 11RL. The wheel speed sensor 11FR corresponds to the front right wheel FR, and the wheel speed sensor 11 FL corresponds to the front left wheel FL. Similarly, the vehicle speed sensor 11RR corresponds to the right rear wheel RR and the vehicle speed sensor 11RL corresponds to the rear left wheel RL. The wheel speed is detected in each wheel speed sensor 11 and detection signals from each wheel speed sensor 11 are input to the electronic control unit 7.

Figure 2:
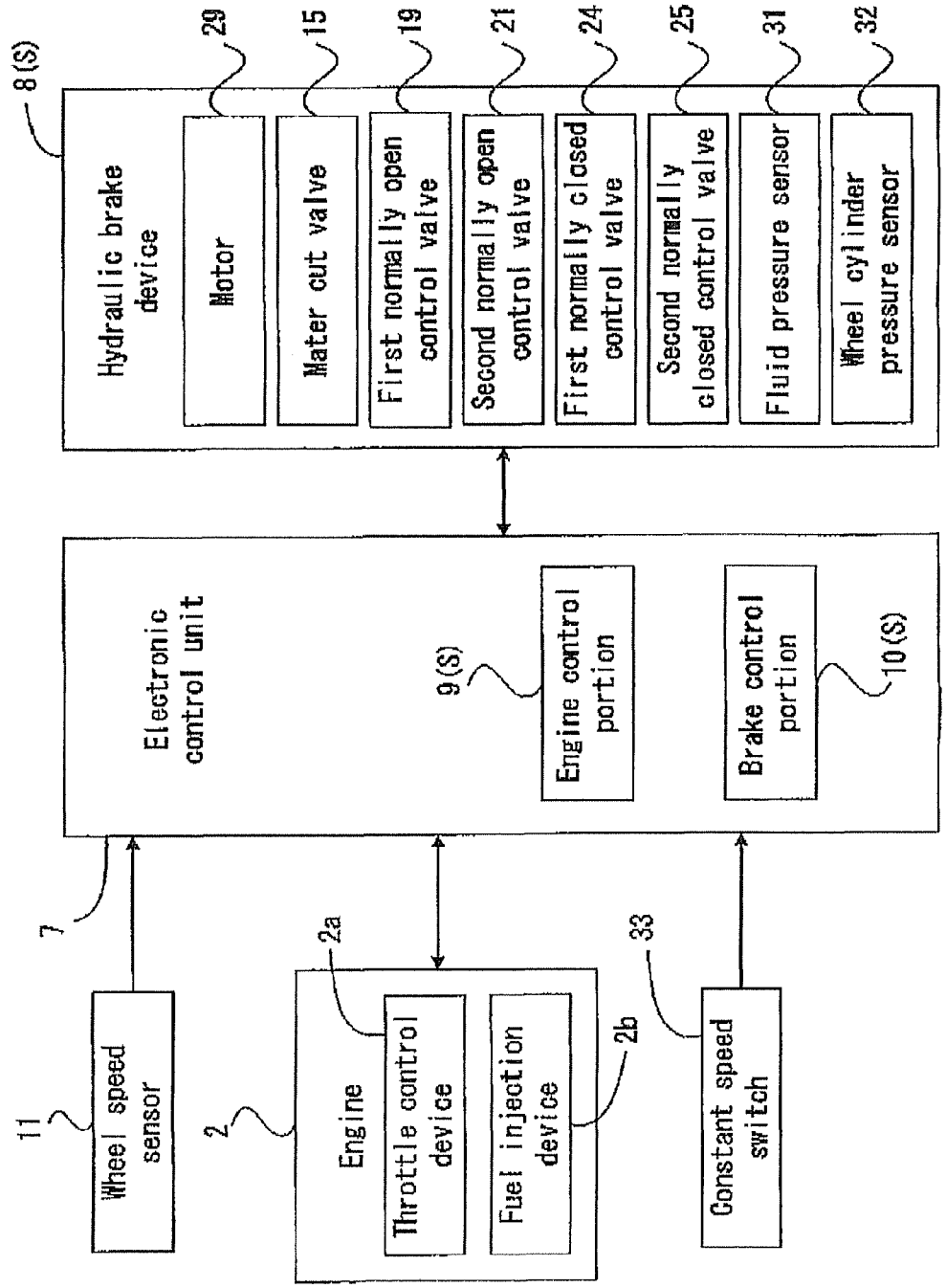
FIG. 2 is a block diagram for a control system.

As shown in FIG. 2, the electronic control unit 7 has an engine control portion 9 and a brake control portion 10. The engine control portion 9 calculates driving torque based on driver's accelerating operation and the like and controls the engine 2 to output the calculated driving torque. The engine control portion 9 corresponds to a driving torque calculating means. The engine 2 has a throttle control device 2a and a fuel injection device 2b. The throttle control device 2a controls a throttle position of the engine 2 to output the driving torque calculated in the engine control portion 9. The fuel injection device 2b controls a fuel injection amount of the engine 2 to output the driving torque calculated in the engine control portion 9.

The hydraulic brake device 8 is configured so as to apply the braking torque to the individual wheels based on the driver's braking operation conducted by depressing the brake pedal. The brake control portion 10 controls the hydraulic brake device 8 so as to apply the braking torque to the individual wheels when the driver does not conduct the braking operation.

Figure 3:
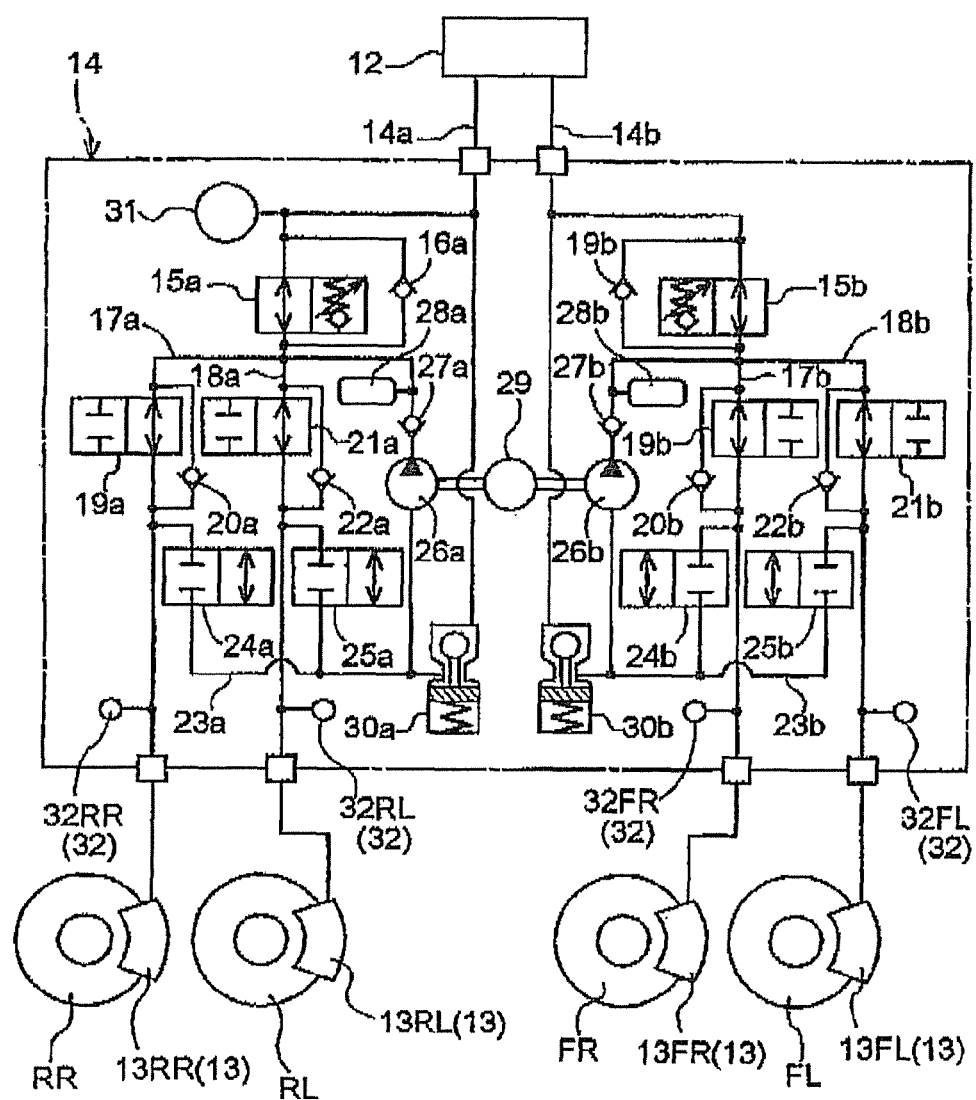
FIG. 3 is a skeleton diagram of a hydraulic brake device.

The hydraulic brake device 8 will be described with reference to FIG. 3. The hydraulic brake device 8 has a master cylinder 12, generating a master cylinder fluid pressure depending on a driver's braking operation force, and a fluid pressure circuit 14, applying the master cylinder fluid pressure to wheel cylinders 13, comprised of 13FR, 13FL, 13RR, and 13RL. The wheel cylinders 13FR, 13FL, 13RR, and 13RL are respectively provided at the wheels FR, FL, RR and RL.

The master cylinder 12 is a tandem type cylinder at which two fluid pressure chambers are provided. Although drawings are omitted, the master cylinder 12 utilizes a force generated by boosting the brake operational force with the booster to generate the master cylinder fluid pressure. Further, the master cylinder 12 is provided with a master reservoir which supplies the brake fluid to the master cylinder 12 and accumulates surplus brake fluid of the master cylinder 12.

The fluid pressure circuit 14 is comprised of a first fluid pressure circuit 14a and a second fluid pressure circuit 14b. One of the fluid pressure chambers of the master cylinder 12 communicates with the wheel cylinder 13RR of the rear right wheel RR and communicates with the wheel cylinder 13RL of the rear left wheel RL through the first fluid pressure circuit 14a. The other fluid pressure chamber of the master cylinder 12 communicates with the wheel cylinder 13FR of the front right wheel FR and communicates with the wheel cylinder 13FL of the front left wheel FL through the second fluid pressure circuit 14b.

A master cut valve 15a is provided in the first fluid pressure circuit 14a, and the master cut valve 15a is switchable between two states, i.e. a communicating state and a shuts off state. In the communicating state, the brake fluid is allowed to flow in the passage from the master cylinder 12 to the wheel cylinders 13. In the shut-off state, the above-mentioned passage is shut off by an appropriate valve and the brake fluid is not allowed to flow. When a pressure at a wheel cylinder side becomes larger than a predetermined pressure generated by pressing a spring in the shut-off state, the master cut valve 15a opens to release the pressure. A non-return valve for the master 16a is provided in parallel with the master cut valve 15a. The non-return valve for the master 16a allows the brake fluid to flow from a master cylinder 12 side to the wheel cylinder 13 side and does not allow the brake fluid to flow in the reverse direction. Even if the master cut valve 15a is in the shut-off states the non-return valve for the master 16a allows the brake fluid to flow from the master cylinder 12 side to the wheel cylinder 13 side to apply the master cylinder fluid pressure to each wheel cylinder 13.

The first fluid pressure circuit 14a branches into a first branch 17a and a second branch 18a at a position that is closer to the wheel cylinders 13 relative to the master cut valve 15a. The first branch 17a and the second branch 18a respectively connect with the wheel cylinder 13RR and the wheel cylinder 13RL. A first normally open control valve 19a is provided at the first branch 17a, and the first normally open control valve 19a is switchable between the two states, i.e. the communicating state and the shut-off state. A first non-return valve 20a is provided in parallel with the first normally open control valve 19a. The first non-return valve 20a allows the brake fluid to flow from the wheel cylinder side 13 to the master cylinder 12 side and does not allow the brake fluid to flow in the reverse direction. As in the first branch 17a, a second normally open control valve 21a and a second non-return valve 22a are provided at the second branch 18a, and the second normally open control valve 21a and the second no-return valve 22a respectively correspond to the first normally open control valve 19a and the first non-return valve 20a.

A branch meeting passage 23a is provided at a portion where a passage, branched from the first branch 17a at a position which is closer to the wheel cylinders 13 relative to the first normally open control valve 19a, meets another passage, branched from the second branch 18a at the position which is closer to the wheel cylinders 13 relative to the second normally open control valve 21a. A first normally closed control valve 24a is provided at a portion of the branch meeting passage 23a, which is branched from the first branch 17a. The first normally closed control valve 24a is switchable between the two states, i.e. the communicating state and the shut-off state. In addition, a second normally closed valve 25a is provided at a portion of the branch meeting passage 23a, which is branched from the second branch 18a, and the second normally closed control valve 25a is switchable between the two states, i.e. the communicating state and the shut-off state. A fluid pressure pump 26a, a third non-return valve 27a, and a damper 28a are provided in this order at a portion of the branch meeting passage 23a that the above-mentioned two passages meet. The fluid pressure pump 26a, the third non-return valve 27a, and the damper 28a connect with a portion of the first fluid pressure circuit 14a, which is located between the master cut valve 15a and the first normally open control valve 19a, or connect with another portion of the first fluid pressure circuit 14a, which is located between the master cut valve 15a and the second normally open control valve 21a. The fluid pressure pump 26a is rotated by a motor 29 to pressurize the brake fluid to reach a predetermined pressure and supply the brake fluid. A reservoir 30a is provided at the branch meeting passage 23a. Specifically, the reservoir 30a is provided between the first and second normally closed control valves 24a and 25a and the fluid pressure pump 26a. The reservoir 30a connects with a passage of the first fluid pressure circuit 14a, which is located between the master cylinder 12 and the master cut valve 15a.

The configuration of the fast fluid pressure circuit 14a in the fluid pressure circuit 14 has been described. The second fluid pressure circuit 14b is configured in a similar manner to the first fluid pressure circuit 14a, and members, which are similar to those provided at the first fluid pressure circuit 14a, are provided at the second fluid pressure circuit 14b. Namely, a master cut valve 15b, a first normally open control valve 19b, a second normally control valve 21b, a first normally closed control valve 24b, a second normally closed control valve 25b, a fluid pressure pump 26b, and the like are provided at the second fluid pressure circuit 14b. In order to distinguish identical members, a letter "a" is added to each reference number of the members provided at the first fluid pressure circuit 14a and a letter "b" is added to each reference number of the members provided at the second fluid pressure circuit 14b. Hereinafter, when indicating both the members provided at the first fluid pressure circuit 14a and the second fluid pressure circuit 14b, the letters "a" and "b" after the reference number are omitted in the description.

The motor 29 drives the fluid pressure pump 26a provided at the first fluid pressure circuit 14a and the fluid pressure pump 26b provided at the second fluid pressure circuit 14b to rotate. A fluid pressure sensor 31 is provided for detecting the master cylinder fluid pressure, and wheel cylinder pressure sensors 32 are provided for detecting a pressure of each wheel cylinder 13. The wheel cylinder pressure sensors 32 are comprised of wheel cylinder pressure sensors 32FR, 32FL, 32RR and 32RL, and the pressure of each wheel pressure 13 is detected in each wheel cylinder pressure sensor 32. Specifically, the wheel cylinder pressure sensor 32FR corresponds to the front right wheel FR and the wheel cylinder pressure sensor 32FL corresponds to the front left wheel FL. Similarly, the wheel cylinder pressure sensor 32RR corresponds to the rear right wheel RR and the wheel cylinder pressure sensor 32RL corresponds to the rear left wheel RL. In this embodiment, the fluid pressure sensor 31 is provided at the first fluid pressure circuit 14a. However, the fluid pressure sensor 31 may be provided at the second fluid pressure circuit 14b.

Returning to FIG. 2, the detection signals from the fluid pressure sensor 31 and each wheel cylinder pressure sensor 32 are input to the electronic control unit 7. The brake control portion 10 controls the master cut valve 15, the first normally open control valve 19, the second normally control valve 21, the first normally closed control valve 24, the second normally closed control valve 25, and the motor 29 based the detection signals from each wheel speed sensor 11, the fluid pressure sensor 31, each wheel cylinder pressure sensor 32, thereby applying the braking torque to the individual wheels. In other words, the brake control portion 10 individually controls the normally open control valve and the normally closed control valve, corresponding to each wheel cylinder 13, thereby applying the wheel cylinder pressure, corresponding to the braking torque, to each wheel cylinder 13.

For example, a case where braking torque is applied to the rear right wheel RR will be described here. When increasing the wheel cylinder pressure, the brake control portion 10 actuates the motor 29 and brings the waster cut valve 15a into the shut-off state. Further, the first normally open control valve 19a is brought into the communicating state and the first normally closed control valve 24a is brought into the shut-off state. When decreasing the wheel cylinder pressure, the brake control portion 10 brings the master cut valve 15a into the shut-off state. Further, the first normally open control valve 19a is switched to be in the shut-off state and the first normally closed control valve 24a is switched to be in the communicating state.

Normally, the vehicle 1 is driven by the driver's accelerating or braking operation. However, the vehicle 1 is configured so as to be able to conduct a constant vehicle speed control, which maintains the vehicle speed at a constant speed without the driver's accelerating or braking operation. The constant vehicle speed control is activated when the driver turns on a constant speed switch 33 and is terminated when the driver turns off the constant speed switch 33.

Hereinafter, the constant vehicle speed control will be described. The engine control portion 9 calculates a demanded driving torque so that the vehicle speed lies within a constant speed range and sets the demanded driving torque as the driving torque. Then, the engine 2 is controlled to output the driving torque calculated as described above. The throttle control device 2a controls the throttle position and the fuel injection device 2b controls the fuel injection amount. The control allows the engine 2 to output the driving torque calculated in the engine control portion 9. The output of the engine 2 is transmitted to the individual driving wheels and the driving torque calculated in the engine control portion 9 is applied to the individual driving wheels.

The constant speed range is set with a target vehicle speed defined as a basing point, for example 10 Km/h. For instance, the constant speed range is set to a range covering the target vehicle speed (for example 10 Km/h)±a predetermined speed. The engine control portion 9 calculates the vehicle speed from the detection signals of each wheel speed sensor 11. For instance, a vehicle speed is determined by calculating an average speed of the wheel speeds detected by the four wheel speed sensors 11. The engine control potion 9 calculates the demanded driving torque based on a difference between the vehicle speed and the target vehicle speed so as to control the vehicle speed to correspond to the target vehicle speed.

When a vehicle is driven with one of a pair of left and right driving wheels being on a low μ road surface, or when a vehicle is driven with one of a pair of left and right driving wheels not sticking to the road surface due to bumps on the road, one of the four driving wheels may slip. In such a case, the brake control portion 10 determines whether or not slippage occurs at each driving wheel by comparing the vehicle speed and the detection signal of the wheel speed sensor 11 corresponding to each driving wheel. For example, the brake control portion 10 determines that the slippage occurs at the driving wheel when the wheel speed detected by the corresponding wheel speed sensor 11 is larger than the vehicle speed and a speed difference therebetween exceeds a threshold value.

When the brake control portion 10 determines that the slippage occurs at the driving wheel(s), the brake control portion 10 controls the hydraulic brake device 8 so that the braking torque, calculated to be applied is individually applied to the slipping driving wheel(s). The hydraulic brake device 8 actuates the motor 29 and brings the master cut valve 15 into the shut-off state. Further, the first normally open control valve 19 or the second normally open control valve 21 is brought into the communicating state. Furthermore, the first normally closed control valve 24 or the second normally closed control valve 25 is brought into the shut-off state. Consequently, the pressure of each wheel cylinder 13 is increased in the slipping driving wheel(s) and the braking torque, calculated to be applied, is individually applied to the slipping driving wheel(s). The brake control portion 10 controls the hydraulic brake device 8 for controlling the braking torque, and the braking torque is controlled so that the wheel speed of each slipping driving wheel lowers to a slip restraining target speed. The hydraulic brake device 8 controls the braking torque by controlling the wheel cylinder pressure. For example, the wheel cylinder pressure is controlled by adjusting a time period for maintaining the first normally open control valve 19 or the second normally open control valve 21 in each state, i.e. the communicating state or the shut-off state.

As just described, when the slippage occurs at the driving wheel(s), the brake control portion 10 and the hydraulic brake device 8 apply the braking torque, calculated to be applied, to the slipping driving wheel(s). In this embodiment, a slip restraining means S is comprised of the brake control portion 10 and the hydraulic brake device 8.

When the slip restraining means S is in operation, i.e. when the slippage occurs at the driving wheel(s), the engine control portion 9 adds a consumed driving torque to the demanded driving torque, calculated in the previous process, for calculating the driving torque. The consumed driving torque corresponds to a driving torque consumed for restraining the slippage at the driving wheel(s) by the brake control portion 10 and the hydraulic brake device 8. When the slippage, occurs at all driving wheels, the engine control portion 9 calculates the driving torque by setting the demanded driving torque as the driving torque, not adding the consumed driving torque to the demanded driving torque.

The engine control portion 9 calculates the consumed driving torque based on the braking torque applied to the slipping driving wheel(s), assuming that the amount of the braking torque applied to the slipping driving wheel(s) corresponds to that of the driving torque consumed for restraining the slippage at the driving wheel(s) by the slip restraining means S. The engine control portion 9 calculates the braking torque based on a below described Formula 1. When the slippage occurs at one driving wheel, the engine control portion 9 sets the calculated braking torque as the consumed driving torque in the calculation process. Further, when the slippage occurs at multiple driving wheels, the engine control portion 9 calculates the braking torque applied to the individual slipping driving wheels based on the Formula 1 and sets a total of each braking torque as the consumed driving torque.

$$Trq1 = \mu \times PWC \times A \times C \times R \quad \text{[Formula 1]}$$

Trq1 is a braking torque, μ is a coefficient of friction of a brake pads PWC is a wheel cylinder pressure, A is an area of a wheel cylinder piston, C is the number of wheel cylinder pistons, and R is a brake effective radius. When the occurrence of the slippage is detected, the wheel cylinder pressure PWC is increased so that a slip amount, i.e. the speed difference between the vehicle speed and the wheel speed, becomes smaller.

In the Formula 1 described above, the coefficient of friction of the brake pad μ, the area of the wheel cylinder piston A, the number of wheel cylinder pistons C, and the brake effective radius R are respectively set to a unique predetermined value by the vehicle 1. Thus, the engine control portion 9 obtains a wheel cylinder pressure PWC from the detection signal of each wheel cylinder sensor 32, corresponding to the wheel cylinder 13 of each slipping driving wheel, and calculates the braking torque by using the Formula 1.

Figure 4:
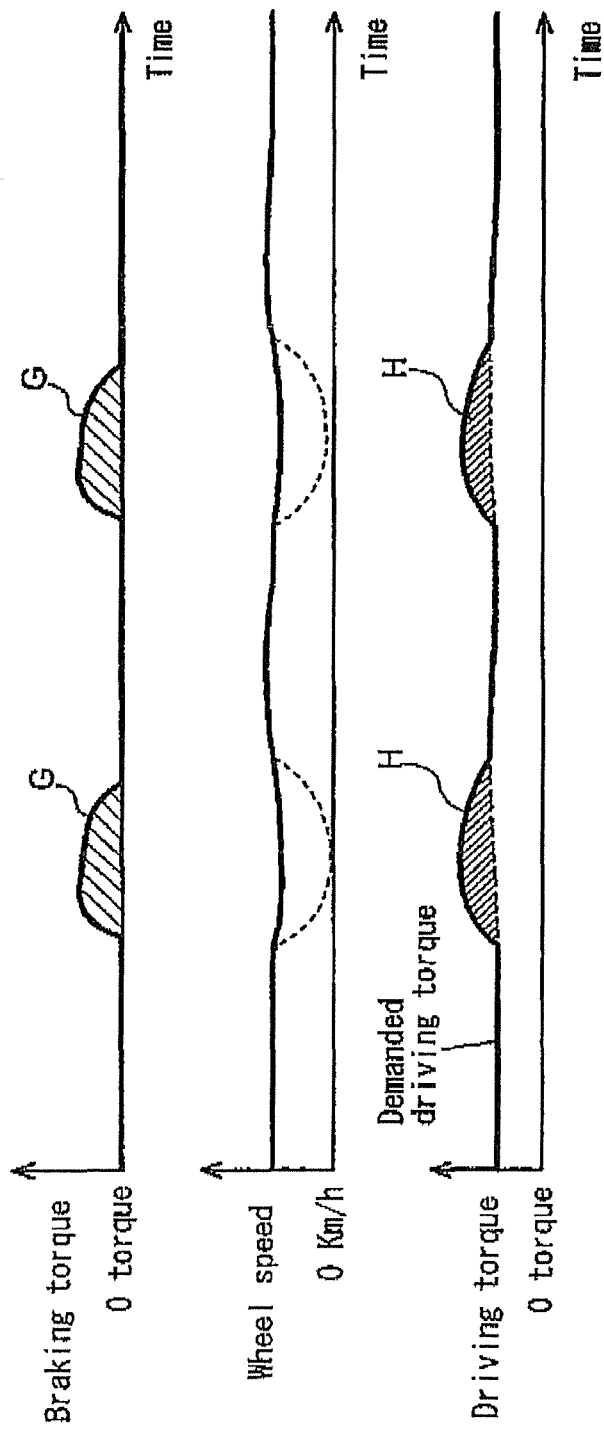
FIG. 4 is a timing chart indicating braking torque, a vehicle speed, and driving torque.

Changes of the braking torque, the wheel speed of the non-slipping driving wheel(s), and the driving torque, observed when the slippage occurs at the driving wheel(s), will be described with reference to a timing chart of FIG. 4. When the slippage occurs at the driving wheel(s), the braking torque is generated to be applied to the slipping driving wheel (s) (G portion in FIG. 4). At this time, the engine control portion 9 adds the consumed driving torque (H portion in FIG. 4) to the demanded driving torque for calculating the driving torque. Consequently, the driving torque, to which the consumed driving torque is added, is applied to the non-slipping driving wheel(s), thus restraining the wheel speed reduction in the non-slipping wheel(s). Therefore, the vehicle speed reduction is restrained and the vehicle 1 is driven maintaining the vehicle speed within the constant speed range. On the other hand, when the slippage occurs at the driving wheel(s), if the engine control portion 9 calculates the driving torque without adding the consumed driving torque to the demanded driving torque, as indicated by dots in FIG. 4, the non-slipping wheel speed is reduced, leading to the vehicle speed reduction.

As just described, in the slip control method according to the embodiment, the, driving torque is calculated and the calculated driving torque is applied to the driving wheels. When the slippage occurs at the driving wheel(s), the slippage of the driving wheel(s) is restrained. When the slippage occurs at the driving wheel(s), the consumed driving torque, corresponding to the driving torque consumed for restraining the driving wheel slippage, is added to the demanded driving torque to calculate the driving torque. This operation restrains the vehicle speed reduction to enable the vehicle 1 to maintain the vehicle speed within the constant speed range.

Figure 5:
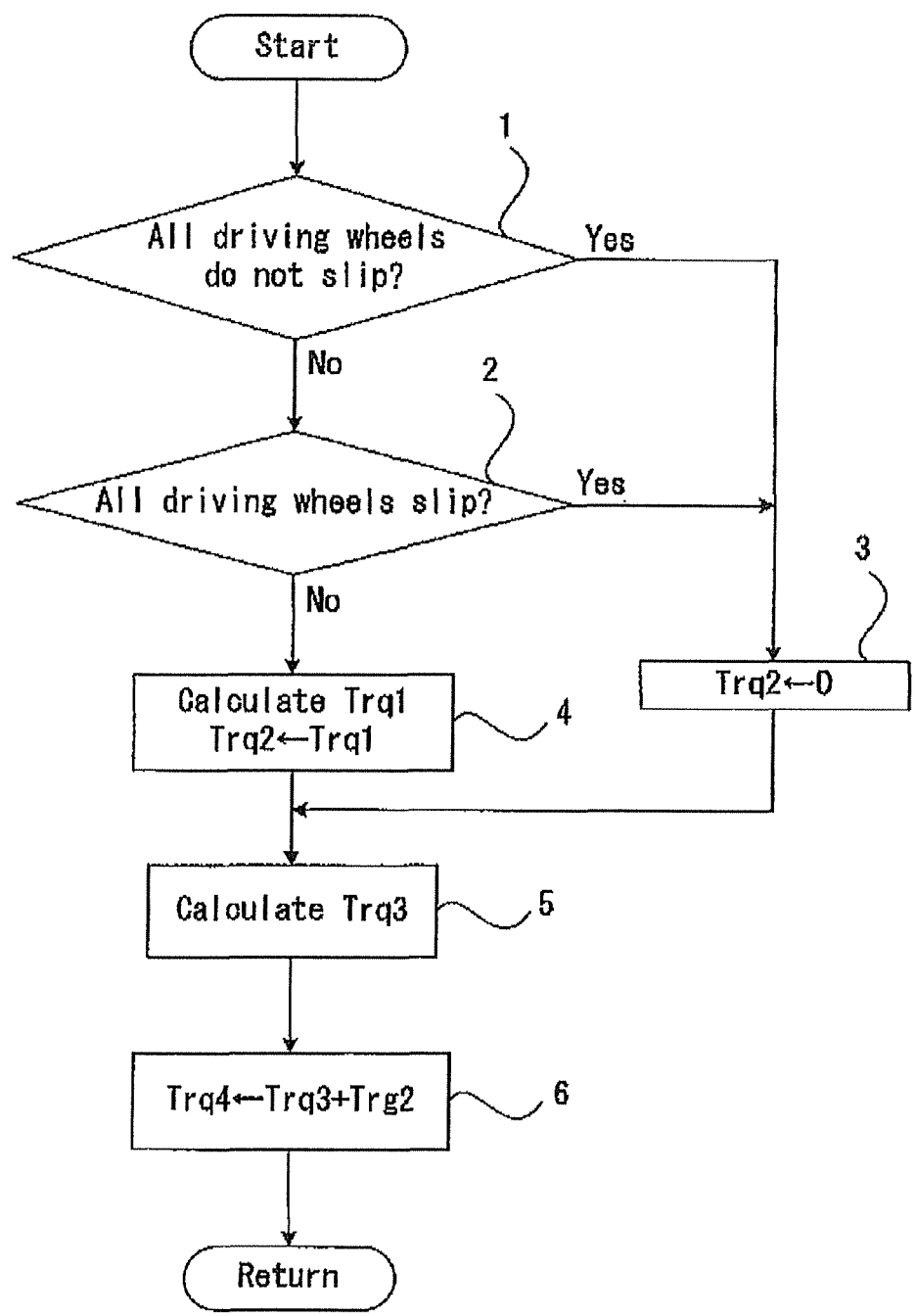
FIG. 5 is a flowchart indicating a driving torque calculation process according to a first embodiment.

The calculation of the driving torque conducted by the engine control portion 9 will be described with reference to a flowchart of FIG. 5. The engine control portion 9 repetitively conducts the operation shown in the flowchart of FIG. 5 at a predetermined cycle. The engine control portion 9 sets a consumed driving torque Trq2 to 0, when the slippage does not occur at all driving wheels or when the slippage occurs at all driving wheels (Steps 1 to 3). When the slippage occurs at one, two, or three driving wheels, the engine control portion 9 calculates a braking torque Trq1 to be applied to the individual slipping driving wheel(s) and sets a total value of each braking torque Trq1 as the consumed driving torque Trq2 (Step 4). The engine control portion 9 calculates a demanded driving torque Trq3 based on a difference between the vehicle speed and the target vehicle speed and adds the consumed driving torque Trq2 to the demanded driving torque Trq3 to calculate and output the driving torque Trq4 (Steps 5 and 6).

[Second Embodiment]

In the first embodiment, a description is provided for a case where the slippage occurs at the driving wheel(s) while conducting the constant vehicle speed control. In a second embodiment, a description is provided for a case where the slippage occurs at the driving wheel(s) while the vehicle is being driven based on the driver's accelerating operation.

The engine control portion 9 calculates a demanded driving torque based on the driver's accelerating operation, and controls the engine 2 to output the driving torque determined as described above. When the slippage occurs at the driving wheel(s), the engine control portion 9 and the brake control portion 10 conduct the traction control, thereby restraining the slippage at the driving wheel(s). Meanwhile, the traction control may be conducted on a steady basis, or may be set to be activated by the driver's switch operation.

In the traction control, when the brake control potion 10 determines that the slippage occurs at the driving wheel(s), as in the first embodiment, the brake control portion 10 controls the hydraulic brake device 8 so that the braking torque is applied to the slipping driving wheel(s). Further, in the traction control, the engine control portion 9 subtracts a driving torque down amount, i.e. an amount of the driving torque to be reduced, from the demanded driving torque to calculate the driving torque (driving torque reducing calculation), and controls the engine 2 to output the driving torque calculated in the driving torque reducing calculation. The engine control portion 9 calculates the driving torque down amount depending on a difference between the wheel speed of the slipping driving wheel and a traction control target speed so that the wheel speed of the slipping driving wheel lowers to the traction control target speed.

As described above, the engine control portion 9 and the brake control portion 10 conduct the traction control when the slippage occurs at the driving wheel(s). In this embodiment, the slip restraining means S is comprised of the engine control portion 9, the brake control portion 10 and the hydraulic brake device 8. When the slip restraining means S is in operation, i.e. when the slippage occurs at the driving wheel(s), the engine control portion 9 does not conduct the driving torque reducing calculation in tile traction control and adds the consumed driving torque to the demanded driving torque for calculating the driving torque. When the slippage occurs at all driving wheels, the engine control portion 9 conducts the driving torque reducing calculation in the traction control.

In the traction control, the brake control portion 10 and the hydraulic brake device 8 apply the braking torque to the slipping driving wheel(s), thereby restraining the slippage. However, with the known slip control apparatus, when the vehicle is driven at a low speed, applying the braking torque causes the vehicle speed reduction and the vehicle is not driven at the driver's intended speed. In the second embodiment, as in the first embodiment, the engine control portion 9 calculates the consumed driving torque based on the braking torque applied to the slipping driving wheel(s).

In the second embodiment, as in the first embodiment, when the slippage occurs at a driving wheel (or driving wheels) A, the driving torque, to which the consumed driving torque is added, is applied to a non-slipping wheel (or non-slipping wheels) B. The driving wheel(s) A slips again due to the driving torque applied, but the vehicle is drivable to a position where the driving wheel A gains grip while restraining the slippage with the braking force applied by the traction control. Further, the vehicle speed reduction is restrained by the applied driving torque. Therefore, the vehicle 1 is driven at a speed demanded by the driver's accelerating operation.

Figure 6:
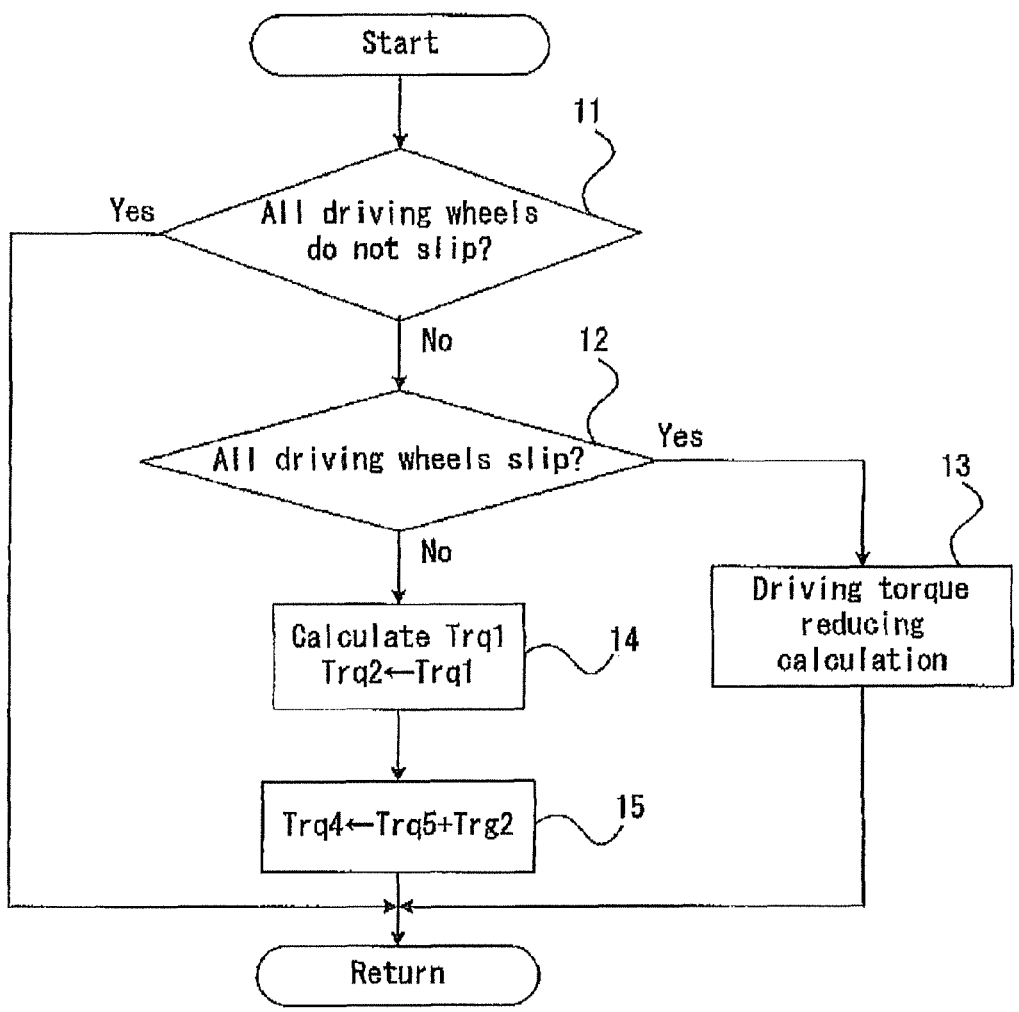
FIG. 6 is a flowchart indicating a driving torque calculation process according to a second embodiment.

The driving torque calculation, conducted by the engine control portion 9 in the traction control, will be described with reference to a flowchart of FIG. 6. The engine control portion 9 repetitively conducts the operation shown in the flowchart of FIG. 6 at a predetermined cycle. The engine control portion 9 does not conduct the driving torque calculation in the traction control unless the slippage occurs at the driving wheel(s). In such a case, the engine control portion 9 calculates the demanded driving torque based on the driver's accelerating operation and sets the demanded driving torque as the driving torque.

When the slippage occurs at the driving wheel(s), the engine control portion 9 determines whether or not the slippage occurs at all driving wheels (Steps 11 and 12). When the slippage occurs at all driving wheels, the engine control portion 9 conducts the driving torque reducing calculation in the traction control to output the driving torque determined by the driving torque reducing calculation (Step 13).

When the slippage occurs at one, two, or three wheels, the engine control portion 9 calculates each braking torque Trq1 applied to the individual slipping wheel(s) and calculates the total of the braking torque Trq1 as the consumed driving torque Trq2 (Step 14). The engine control portion 9 adds the consumed driving torque Trq2 to the demanded driving torque Trq5 calculated based on the driver's accelerating operation to calculate and output the driving torque Trq4 (Step 15).

[Other Embodiment]

In the first and second embodiments, the engine control portion 9 calculates the consumed driving torque based on the braking torque applied to the individual slipping driving wheel(s). However, instead of the above-described calculation method, the engine control portion 9 calculates the consumed driving torque based on a difference between a rotation speed of the slipping wheel and a rotation speed of the non-slipping wheel. In this case, the engine control portion 9 calculates the rotation speeds of the slipping and non-slipping driving wheels from the detection signals of each wheel speed sensor 11. Then, the consumed driving torque is calculated by using Formula 2.

$$\text{Trq}6 = (F1 - F2) \times \alpha \qquad \text{[Formula 2]}$$

Trq6 is a consumed driving torque, F1 is a rotation speed of a slipping driving wheel, F2 is a rotation speed of a non-slipping driving % wheel, and $\alpha$ is a coefficient determined based on experimental results.

(2) In the first and second embodiments, when the slippage occurs at one, two or three driving wheel(s), the engine control portion 9 may calculate the consumed driving torque by multiplying a total value of the braking torque applied to the individual driving wheel(s) by a coefficient $\beta$. In this case, the coefficient $\beta$ may be set to a constant value or may be set to a variable depending on a condition of the vehicle 1 such as the vehicle speed.

(3) In the first and second embodiments, the fluid pressure circuit 4 may be configured in another manner. For example, in the first fluid pressure circuit 14a, the master cylinder fluid pressure is applied to the wheel cylinder 13FR provided at the front right wheel FR and is applied to the wheel cylinder 13RL provided at the rear left wheel RL. In the second fluid pressure circuit 14b, the master cylinder fluid pressure is applied to the wheel cylinder 13FL provided at the front left wheel FL and is applied to the wheel cylinder 13RR provided at the rear right wheel RR. The fluid pressure circuit 4 may be configured in this manner. Namely, structure of the fluid pressure circuit 4, i.e. how the master cylinder fluid pressure is applied to the individual wheel cylinders, may be modified in an appropriate manner.

(4) In the first and second embodiments, the output of the engine 2 may be transmitted to the front right wheel FR and the front left wheel FL, and uses the front right wheel FR and the left front wheel FL as the driving wheels. Alternatively, the output of the engine 2 may be transmitted to the rear right wheel RR and the rear left wheel RL, and uses the rear right wheel RR and the rear left wheel RL as the driving wheels.

(5) In the first and second embodiments, the driving torque applying means is comprised of the engine 2 and the driving force transmitting mechanism transmitting the output of the engine 2 to the individual wheels. However, in a hybrid vehicles the driving torque applying means may be comprised of the engine 2, an electric motor, the driving force transmitting mechanism transmitting the outputs of the engine 2 and the electric motor to the individual wheels.

(6) In the first and second embodiments, the braking torque to be applied to the slipping driving wheel(s) is calculated by using the formulas. However, the braking torque, which is actually applied to the driving wheel(s), may be detected to determine the amount of the driving torque to be applied to the non-slipping wheel(s).

The invention applies to various kinds of slip control apparatuses which are provided with the engine control portion 9 for calculating the driving torque, the engine 2 and the driving force transmitting mechanism applying the calculated driving torque to the driving wheels, and the brake control portion 10 and the hydraulic brake device 8 for restraining the driving wheel slippage when the slippage occurs at the driving wheel (s). The slip control apparatuses restrain the driving wheel slippage and enable the vehicles to run at the demanded vehicle speed.

According to the embodiments, the structural feature of the slip control apparatus is that the slip control apparatus includes the engine control portion 9 calculating the driving torque, the engine 2 and the driving force transmitting mechanism applying the calculated driving torque to the driving wheels, and the brake control portion 10 and the hydraulic brake device 8 restraining the slippage at each driving wheel when the slippage occurs at each driving wheel, wherein when the slippage occurs at each driving wheel, the engine control portion 9 calculates the demanded torque and adds the consumed driving torque, which corresponds to the driving torque consumed for restraining the slippage at each driving wheel by the brake control portion 10 and the hydraulic brake device 8, to the calculated demanded torque to calculate the driving torque.

When the slippage occurs at the one of the pair of the left and right wheels, the brake control portion 10 and the hydraulic brake device 8 reduce the driving torque and apply the braking torque to the slipping driving wheel(s), thereby restraining the slippage. Thus, the braking torque is applied for the restraining the slippage and the demanded driving torque, which is used for rotating the wheel(s), is reduced. Namely, the driving torque is consumed for restraining the slippage. Thus, when the slippage occurs at the driving wheel (s), the engine control portion 9 adds the consumed driving torque to the demanded driving torque to calculate the driving torque, not setting the demanded driving torque to the driving torque. When the calculation of the driving torque is conducted in this way, the engine 2 and the driving force transmitting mechanism apply the driving torque, calculated by adding the consumed driving torque to the demanded driving torque, to the diving wheel(s). Thus, the consumed driving torque is added to the driving torque applied to the non-slipping driving wheel(s). Therefore, even if the slippage occurs at the driving wheel(s), the reduction of the vehicle speed is restrained and the vehicle is driven at the demanded vehicle speed.

According to the embodiments, the structural feature of the slip control apparatus is that the brake control portion 10 and the hydraulic brake device 8 restrain the slippage at the driving wheels by individually applying the braking torque to the driving wheels and the engine control portion 9 calculates the consumed driving torque based on the braking torque applied to the driving wheels for calculating the driving torque. Meanwhile, in this specification, "based on the braking torque applied to the driving wheels" means "based on the braking torque which is actually applied to the driving wheels" and "based on the braking torque which is calculated to be applied to the driving wheels".

When the brake control portion 10 and the hydraulic brake device 8 apply the braking torque to the slipping driving wheel(s), the driving torque is consumed for applying the braking torque to restrain the slippage at the driving wheel(s). Thus, in the embodiments, the consumed driving torque is accurately calculated based on the braking torque applied to the driving wheels, assuming that the braking torque corresponds to the driving torque consumed for restraining the wheel slippage by the brake control portion 10 and the hydraulic brake device 8.

According to the embodiment, the structural feature of the slip control apparatus is that the engine control portion 9 calculates the consumed driving torque based on the difference between the rotation speed of the slipping driving wheel and the rotation speed of the non-slipping driving wheel.

When the slippage occurs at the driving wheel(s), a certain relationship is established between the rotation speed difference, which occurs between the non-slipping driving wheel and the slipping driving wheel, and the driving torque consumed for restraining the wheel slippage by the brake control portion 10 and the hydraulic brake device 8. Thus, in the embodiments, the consumed driving torque is accurately calculated based on the rotation speed difference between the non-slipping wheel and the slipping wheel.

According to the embodiment, the structural feature of the slip control apparatus is that when the slippage occurs at all the driving wheels, the engine control portion 9 calculates the driving torque without adding the consumed driving torque to the demanded driving torque.

When the slippage occurs at all driving wheels and the driving torque becomes large, the driving of the vehicle becomes unstable. Accordingly, when the slippage occurs at all driving wheels, the engine control portion 9 calculates the driving torque by setting the demanded driving torque to the driving torque without increasing the driving torque. When the slippage occurs at all driving wheels, deterioration of the running stability is restrained in this way.

According to the embodiment, the structural feature of the slip control apparatus is that the engine control portion 9 calculates the demanded driving torque so that vehicle speed lies within the constant speed range.

The demanded driving torque is calculated as described above, thereby applying the driving torque in the manner that the vehicle speed lies within the constant speed range without the driver's accelerating and braking operation. Therefore, the vehicle is stably driven within the constant speed range without the driver's manipulation. Further, when driving the vehicle within the constant speed range as described above, even if the slippage occurs at the driving wheel(s), the vehicle speed reduction is restrained, and thus maintaining the vehicle to run within the constant speed range.

According to the embodiment, the structural feature of the slip control apparatus is that the driving torque calculating means calculates the demanded driving torque based on the driver's accelerating operation.

The demanded driving torque is calculated as described above, and the calculation enables the vehicle to run at the driver's intended vehicle speed, prioritizing the driver's accelerating operation. Further, as described above, when the slippage occurs at the driving wheel(s), the reduction of the vehicle speed is restrained and thus driving the vehicle so as to maintain the vehicle speed demanded by the driver.

According to the embodiment, the structural feature of the slip control method is that the slip control method includes the steps of calculating the driving torque, applying the calculated driving torque to the driving wheels, and restraining the slippage at each driving wheel when the slippage occurs at each driving wheel, wherein the driving torque is calculated by adding the consumed driving torque, which corresponds to the driving torque consumed for restraining the slippage at the individual driving wheels, to the demanded driving torque.

As in the characteristics of the slip control apparatus according to the embodiments, when the slippage occurs at the driving wheel(s), the consumed driving torque is added to the demanded driving torque to calculate the driving torque, instead of using the demanded driving torque as the driving torque. Accordingly, the consumed driving torque is added to the demanded driving torque to calculate the driving torque applied to the non-slipping wheel. As a result, even if the slippage occurs at the driving wheel(s), the reduction of the vehicle speed is restrained and the vehicle is driven at the demanded vehicle speed.

The principles, of the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A slip control apparatus comprising:
   a driving torque calculating means for calculating a demanded torque demanded for driving driving wheels so that a vehicle speed lies within a constant speed range, the driving torque calculating means also calculating a driving torque for driving the driving wheels so that the vehicle speed lies within the constant speed range even if slippage of at least one of the driving wheels occurs;
   a driving torque applying means for applying the calculated driving torque to the driving wheels;
   a slip restraining means having a brake control portion calculating braking torque to apply to a slipping driving wheel when the slippage occurs at the driving wheel, for individually applying the calculated braking torque to each of the slipping driving wheels to restrain slippage at each of the slipping driving wheels;
   wherein when the slippage does not occur at each driving wheel, the driving torque calculated by the driving torque calculating means is the demanded torque;
   wherein when the slippage occurs at some of the driving wheels, the driving torque calculated by the driving torque calculating means is a sum of the demanded torque and a consumed driving torque corresponding to a driving torque consumed by restraining the driving wheel slippage; and
   the consumed driving torque is the brake torque calculated by the brake control portion.

2. A slip control apparatus according to claim 1, wherein when the slippage occurs at all the driving wheels, the driving torque calculating means calculates the driving torque without adding the consumed driving torque to the demanded driving torque.

3. A slip control apparatus according to claim 2, wherein the vehicle speed is estimated based on wheel speeds detected at each wheel speed sensor, and the constant speed range is set to a predetermined range from the estimated vehicle speed set as a basing point.

4. A slip control apparatus according to claim 3, wherein the constant speed range is set to the predetermined range from 10 Km/h set as the basing point.

5. A slip control apparatus according to claim 2, wherein the driving torque calculating means calculates the demanded driving torque based on accelerating operation conducted by a driver.

6. A slip control apparatus according to claim 1, wherein the driving torque calculating means calculates the consumed driving torque based on a difference between a rotation speed of a slipping driving wheel and a rotation speed of a non-slipping driving wheel.

7. A slip control apparatus according to claim 6, wherein when the slippage occurs at all the driving wheels, the driving torque calculating means calculates the driving torque without adding the consumed driving torque to the demanded driving torque.

8. A slip control apparatus according to claim 7, wherein the vehicle speed is estimated based on wheel speeds detected at each wheel speed sensor, and the constant speed range is set to a predetermined range from the estimated vehicle speed set as a basing point.

9. A slip control apparatus according to claim 8, wherein the constant speed range is set to the predetermined range from 10 Km/h set as the basing point.

10. A slip control apparatus according to claim 7, wherein the driving torque calculating means calculates the demanded driving torque based on accelerating operation conducted by a driver.

11. A slip control apparatus according to claim 1, wherein when the slippage occurs at all the driving wheels, the driving torque calculating means calculates the driving torque without adding the consumed driving torque to the demanded driving torque.

12. A slip control apparatus according to claim 1, wherein the vehicle speed is estimated based on wheel speeds detected at each wheel speed sensor, and the constant speed range is set to a predetermined range from the estimated vehicle speed set as a basing point.

13. A slip control apparatus according to claim 12, wherein the constant speed range is set to the predetermined range from 10 Km/h set as the basing point.

14. A slip control apparatus according to claim 1, wherein the driving torque calculating means calculates the demanded driving torque based on accelerating operation conducted by a driver.

15. A slip control apparatus according to claim 1, wherein an average rotation speed of the driving wheel corresponds to a target vehicle speed in the desired state.

* * * * *